United States Patent [19]

Boyle

[11] Patent Number: 4,555,340

[45] Date of Patent: Nov. 26, 1985

[54] EXCESS OVERFLOW ORIFICE TUBES

[75] Inventor: William H. Boyle, Milwaukee, Wis.

[73] Assignee: Envirex Inc., Waukesha, Wis.

[21] Appl. No.: 545,561

[22] Filed: Oct. 26, 1983

[51] Int. Cl.$^4$ .............................................. B01D 21/24
[52] U.S. Cl. ..................................... 210/248; 210/519; 210/521; 210/525; 210/921
[58] Field of Search ............... 210/800, 519, 521, 523, 210/525, 528, 921, 248, 349, 541, 542

[56] References Cited

U.S. PATENT DOCUMENTS

| | | | |
|---|---|---|---|
| 2,961,099 | 11/1960 | Lind et al. | 210/519 |
| 2,961,100 | 11/1960 | Katz et al. | 210/519 |
| 3,017,998 | 1/1962 | Conley | 210/519 |
| 3,136,724 | 6/1964 | Lind et al. | 210/519 |
| 3,717,257 | 2/1973 | Boyle | 210/521 |
| 3,926,805 | 12/1975 | Walker | 210/519 |
| 4,038,185 | 7/1977 | Kline | 210/525 |
| 4,059,529 | 11/1977 | McGivern | 210/519 |

*Primary Examiner*—Richard V. Fisher
*Assistant Examiner*—Wanda L. Millard
*Attorney, Agent, or Firm*—Lawrence J. Crain

[57] ABSTRACT

A final clarifier for a sewage treatment plant has a peripheral feed influent channel with lower distribution ports and is also provided with tubes to minimize the headloss in the clarifier. The minimum headloss tubes are set to allow the basin to operate at more than one limiting headloss set point. By increasing the available orifice area at a certain flow rate, a maximum or peak headloss limitation can be achieved without compromising the design (average) headloss.

6 Claims, 9 Drawing Figures

EXCESS OVERFLOW ORIFICE TUBES

BACKGROUND OF THE INVENTION

The typical wastewater treatment plant includes a final clarifier in which the suspended solids from the prior treatment step are allowed to settle out. These solids generally have very low settling rates so it is important that the tank be designed to operate at its design average flow rate and also at the designed maximum flow rate. Proper operation includes maintenance of the headloss within the design ranges and uniform distribution of the liquid around the influent ports.

Clarifiers built before about 1958 were usually of the center feed type; since then, the demonstrable advantage of peripheral feed clarifiers, as disclosed in U.S. Pat. Nos. 2,961,099, 2,961,100 and 3,717,257 have made this type of clarifier preferred. In such clarifiers, the cross sectional flow area of the peripheral feed channel diminishes in the direction of flow, and is usually provided with a series of large ports which are not susceptible to clogging. Generally, all such ports are of the same size; the spacing between ports is selected to provide an equal distribution of the feed around the periphery of the basin.

The cross sectional flow area in relatively long influent channels must decrease in the direction of flow, and overflow launders must increase in cross section in their direction of flows so that neither the velocity of the flows nor the headloss becomes excessive. The change in cross sectional flow area of the channels is accomplished by varying their width along their length, or by sloping the channel floors.

The design of the clarifier must account for the wide range of flows, which include the minimum, average, maximum, and hydraulic peak. Normally a plant runs at the average (design) flow at 90% of the time for many years. Maximum or peak flow occurs due to wet weather or storm conditions. Also, when the sewage system is expanded the average or designed flow may be exceeded.

According to the current common practice, the orifices from the influent channels to the basin are designed for a given range of flow, and the headloss is a function of the orifice flow ratio, squared. This relationship is based on the following orifice equation:

$$A_O = \frac{Q}{C\sqrt{2gH_L}}$$

Where:
$A_O$ = Orifice Area
$Q$ = Orifice Flow
$C$ = Coefficient of Discharge  $g$ = Acceleration due to Gravity (32.2 ft/sec$^2$)
$H_L$ = Orifice Headloss When the headloss and area is set for one flow, the headloss at another flow can be determined by the equation:

$$H_{LS}/Q^2{}_S = H_{Lu}/Q^2{}_O$$

or $$H_{Lu} = H_{LS}(Q^2{}_O/q^2{}_S)$$

Where:

$H_{LS}$ = Set Orifice Headloss
$H_{LU}$ = Unknown Orifice Headloss
$Q_S$ = Orifice flow at set flow
$Q_O$ = Orifice flow at other flow For example, if the orifice flow is five units for the unknown peak to one unit for the set, and the set headloss is 0.2 feet, the unknown headloss is therefore:

$$0.2(5^2/1^2) = 5.0 \text{ feet}$$

In this example the hydraulic system would have to be sized for an additional 5 feet of headloss to accommodate the peak flow.

The headloss in a final clarifier directly affects capital and operating costs. A high headloss requires that the peripheral feed channel walls be high enough to contain the liquid at its maximum water level and also requires that the system upstream of the final clarifier be designed with sufficient head to ensure flow at the designed rate into the clarifier. This may require pumps and additional retaining wall heights which incresase operating (energy and maintenance) costs as well as increase capital costs.

The field has thus long been in need of a simple, inexpensive, and reliable system in a clarifier for handling the flow rate at maximum or peak flows without excessive headloss while allowing the clarifier to operate properly at the design or set flow rate.

SUMMARY OF THE INVENTION

The object of this invention is to provide an orifice system in the influent channel of a peripheral feed clarifier that enables the basin to operate at one or more points in addition to the design headloss set point.

Another object of this invention is to provide an orifice system for a clarifier that increases the available orifice area at and beyond a certain flow rate, so that the maximum or peak headloss limitation can be met without compromising the designed headloss.

These objects are achieved by the invention which includes an additional set of orifices opening into the influent channel at an elevation between the average set water level and the design maximum level. As the flow increases from the average toward the design maximum level, the headloss increases due to an increase in flow, and the channel liquid surface level rises to the elevation at which the additional orifices are provided, at which elevation the effective orifice area increases by the cross-sectional flow area of the additional orifices. The elevation and position of these additional orifices depends on the design requirements of the flows. This invention also allows a channel skimmer to pass through the channel without obstructions impeding it.

DESCRIPTION OF THE PREFERRED EMBODIMENT

Figure 1:
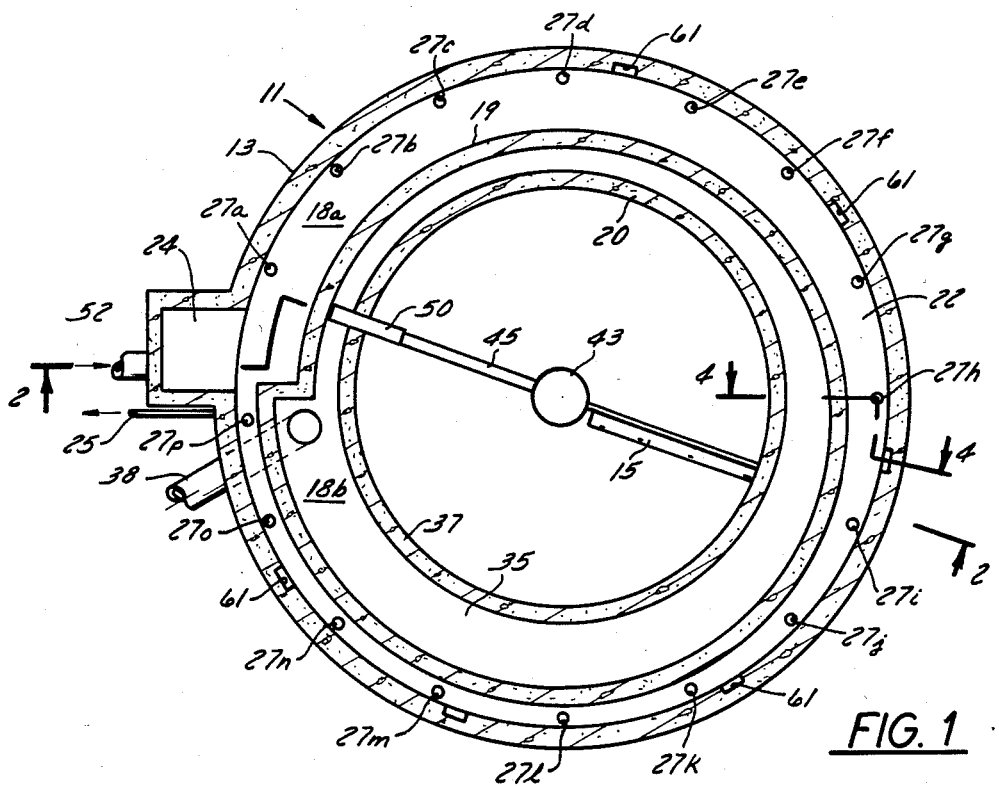
FIG. 1 is a plan view of a clarifier having peripheral influent feed and effluent channels and second-stage orifices according to the present invention.

Referring now to the drawings, wherein like reference numerals identify identical or corresponding parts, and more particularly to FIG. 1 thereof, a sedimentation tank or clarifier of concrete construction is illustrated having a floor 12 and cylindrical sidewall 13. The floor 12 slopes downwardly to a central mounting hub 14 to which a sludge withdrawal or Tow-Bro Eductor pipe 15 is connected. The eductor 15 is connected to the suction port of a pump for suction of sludge which settles to the bottom of the clarifier 11. The slude is drawn through the eductor 15 and out a withdrawal pipe 16 to a dewatering or digestion facility.

A cantilevered floor 18 extends radially inward from the wall 13 and supports an upstanding volute or spiral intermediate wall 19 and an inner wall 20 concentric with the tank wall 13. The upper part of sidewall 13 and the volute or spiral intermediate wall 19 define the sides of an influent or feed channel 22 which is wide at the inlet end at a feed box 24, and becomes progressively narrower toward the other end. The feed channel 22 extends completely around the tank 11 from the inlet or feed box 24 to a scum removal pipe 25 at the angularly remote end from the feed box 24. The radial outer portion 18a of the floor 18 forms the floor of the influent channel 22 and is provided with a series of ports 27 through which the influent liquid passes into the upper end of a large annular distribution chamber 33 which extends fully around tank 11. The distribution chamber 33 is defined by the underside of the influent channel floor 18a, an annular skirt 34 extending downwardly therefrom, and the tank sidewall 13.

A first port 27a is positioned adjacent the feed box 24 and a series of ports 27b-o are provided around the channel 22, ending in an end port 27p positioned adjacent the scum pipe 25 at the narrow end of the channel 22. In the construction of tank 11, the ports 27a-p are defined by steel liners 31. The liners 31 are fixed in position on the form before the concrete is poured, and are left in place after concrete forms are removed.

The influent feed flows along the channel 22, through the ports 27a-p, and passes below skirt 34 to enter the tank. A certain minimum elevation of liquid in the influent channel 22 is desirable to provide a hydraulic head to drive the liquid down into the tank to produce the correct hydraulic path and prevent short-circuiting of solids up to and over an overflow weir 30 on the inner wall 20 before they have settled. The liquid flows slowly toward the center while the solids settle down to the tank floor 12 where they are removed by the revolving eductor tube 15. The clarified flow then moves in a pattern similar to a collar vortex upwardly and outwardly toward a peripheral overflow launder 35 which is formed by the inner volute wall 19, the inner portion 18b of the cantilevered floor 18 and the weir wall 20 concentric with the sidewall 13. The influent feed channel 22 and the effluent trough or launder 35 as shown are all of concrete construction and integral with sidewall 13. An effluent pipe 38 leads from the launder 35, extends through the skirt 34 and the sidewall 13 to a secondary polishing for final treatment facility or receiving stream.

Various means for removing the settled sludge from the floor 12 of the tank 11 may be provided. In the preferred embodiment, an eductor 15 is used. It is supported and moved around floor 12 by a drive column 42 which is rotated slowly and/or intermittently by an upper drive mechanism 43 which may be mounted on a central pier, not shown, or support by a bridge, not shown.

Figure 2:
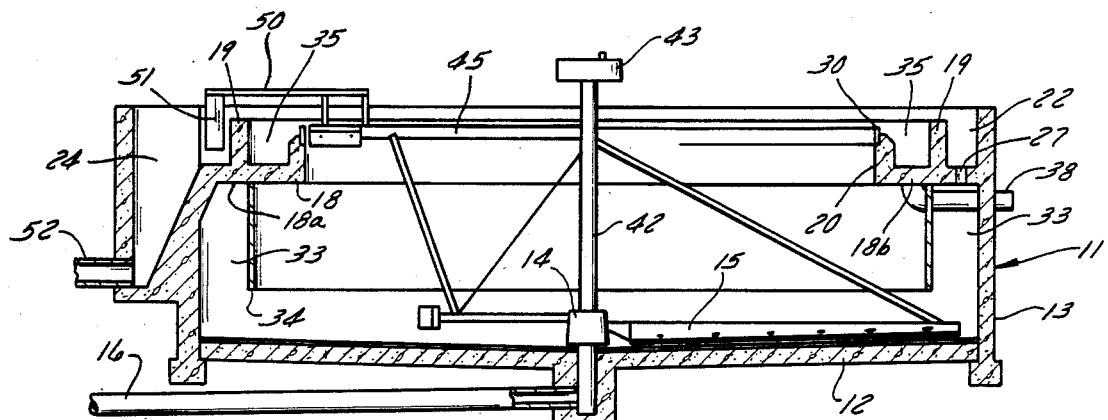
FIG. 2 is a cross-sectional elevation of the tank along lines 2—2 in FIG. 1.

As shown in FIG. 2, the drive column 42 also supports a tank surface skimmer blade 45 which rotates about the vertical axis of the column 42. An upper extension arm 50 is supported from blade 45 and extends over the channels 22 and 35 as the blade 45 is rotated by the column 42. The arm 50 carries a flexible pusher blade 51 which extends downwardly between the sidewall 13 and the intermediate wall 19. The pusher 51 pushes floating matter into the scum pipe 25 whence it flows back to the influent end of the treatment plant, or is wasted to a solids handling unit, such as dissolved air flotation unit.

In the operation of tank 11, the influent enters the feed box 24 from a feed pipe 52 and flows into and around the channel 22. It is important to note (a) that the elevation of the surface of the liquid in the tank varies only from a fraction of an inch above the weir 30 of wall 20 at low flows and for example only up to two inches above the weir at the maximum, or design flow of the tank and (b) that the headloss through the ports 27a-p is a function of the water elevation in the channel 22. In a typical installation, for example, the headloss through ports 27a-p varies from ¼ inch to 1 foot or more.

Figure 3:
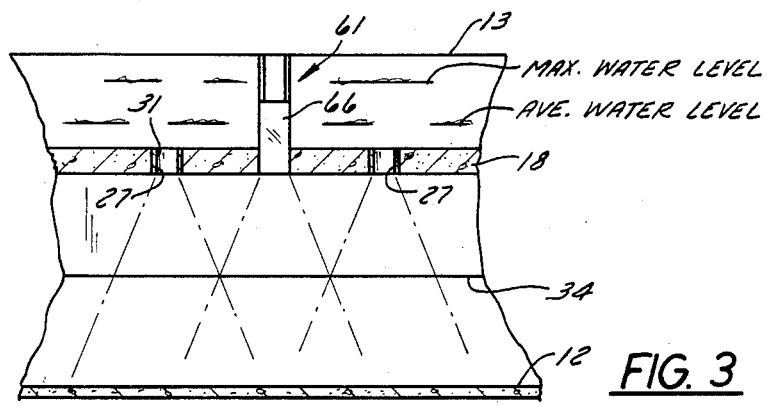
FIG. 3 is a schematic profile of a portion of the peripheral feed channel of the clarifier tank shown in FIGS. 1 and 2.
Figure 4:
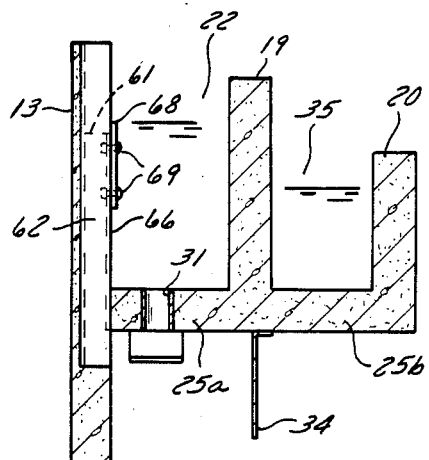
FIG. 4 is a section taken on line 4—4 of FIG. 1.
Figure 5:
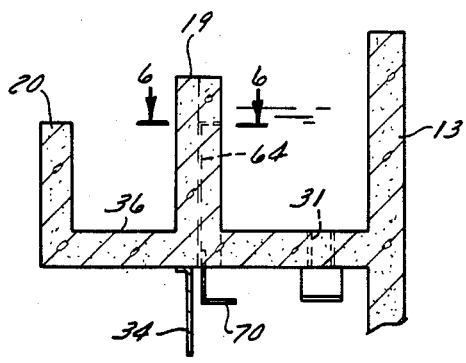
FIG. 5 is a section of the peripheral feed and effluent channels of another embodiment of a peripheral feed clarifier according to this invention.
Figure 6:
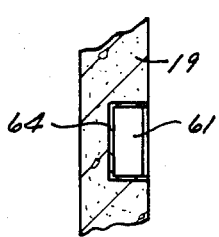
FIG. 6 is a section along lines 6—6 in FIG. 5.

As shown in FIGS. 3 and 4, a set of second stage orifices 61 is set in the tank wall 13, each opening into an overflow tube or conduit 62. As shown in FIGS. 5 and 6, these overflow conduits, identified as items 64 in FIGS. 5 and 6, can also be set into the common wall 19 between the influent and effluent channels. As shown in FIGS. 1 and 4 the second stage orifices 61 are set between some of the first stage orifices 27 in channel 22. The height of the second stage orifices 61 is set at an elevation intermediate the average and maximum elevations of the flow in the channels. The particular height chosen is a function of the orifice diameter, the designed average headloss, the designed headloss at maximum flow and the size of the tank. Normally, the elevation of the orifices 61 will be 2-6 inches above the designed water level in the influent channel 22. At low flows when the flow elevation is below the lip of the second stage orifices 61, the hydraulic pattern is unaffected since this coincides with the average (design) conditions.

As the flow through the plant increases, the channel flow rises above the lip of the second stage orifices 61. The flow at all times is continually being drawn from the surface of the channel 22 and runs through ports 27a-p which operate independently of the second stage orifices 61. When, the surface of the influent feed in the channel 22 rises above the lip of the second stage orifices 61, the flow then enters the second stage orifices 61 and flows through the overflow channels 62 into the distribution chamber 33.

Figure 9:
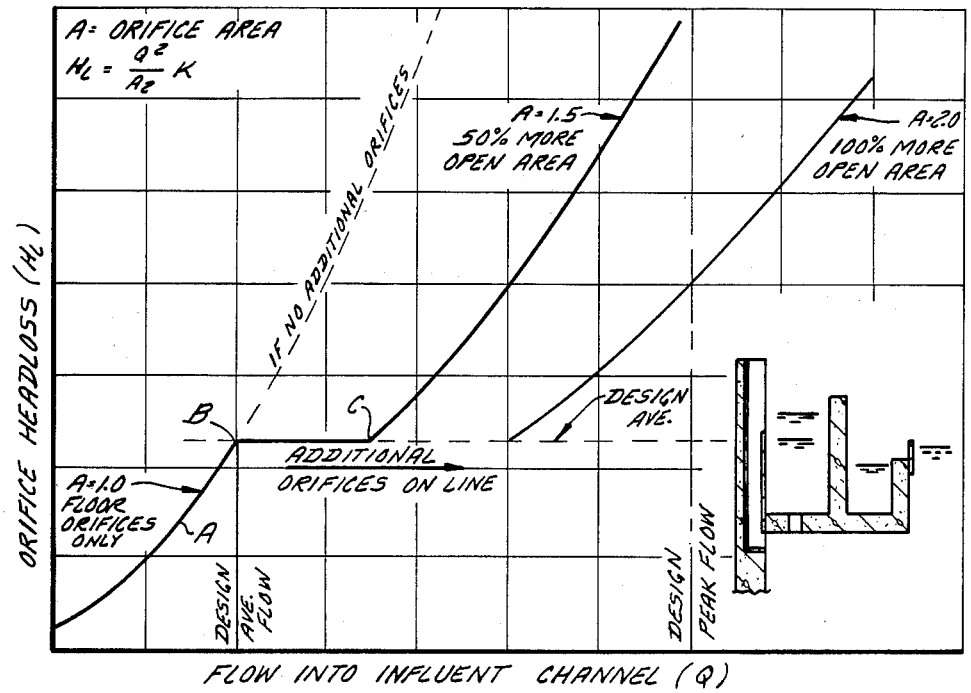
FIG. 9 is a graph showing headloss in the feed channel as a function of volumetric flow rate into the feed channel.

The additional headloss that would otherwise result from the increase flow is prevented by the additional orifice flow area supplied by the second stage orifices 61. This is illustrated in FIG. 9, which shows that the headloss through the floor orifices only increase on a roughly parabolic curve (A) as the influent flow increases up until the level of the secondary orifices is reached. At that point, (B) the flow through the secondary orifices begins. The capacity of the secondary orifices is such that the influent flow can increase substantially beyond the rate at which the secondary orifices were reached before their capacity is reached (C) and the liquid level begins to rise again.

As shown in FIG. 4, each second stage orifice 61 is at the top of a front plate 66 of the overflow channel 62. The height of the second stage orifices may be made adjustable as shown by the movable weir plates 68 fastened to the front plates 66 by fasteners 69. To change the elevation of the secondary orifices, it is merely necessary to loosen the fasteners 69, reposition the movable weir plate 68, and retighten the fasteners 69. The channel 62 is set in the concrete wall 13 and extends from top of said wall to a point just below the floor 25a of the channel 22.

FIG. 5 shows an arrangement wherein channels 64 are located in the common wall 19. A deflector baffle 70 is added to disperse the flow into the area of the skirt baffle 34 and the tank wall 13.

Figure 7:
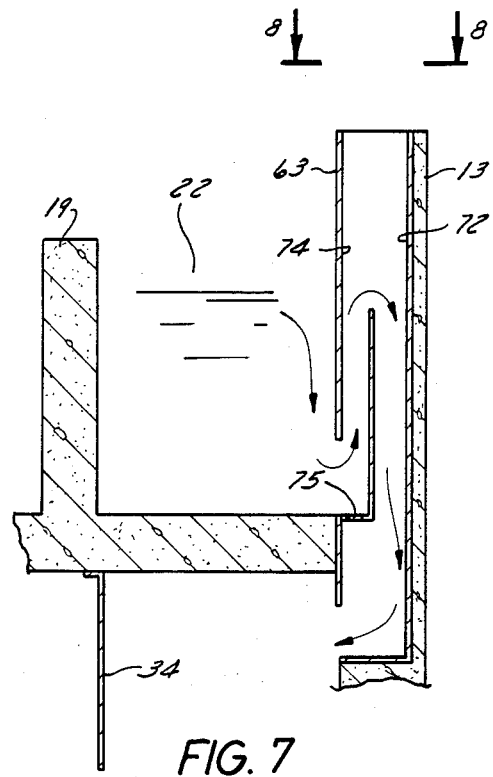
FIG. 7 is a sectional elevation of a portion of an influent channel of a third embodiment of a clarifier tank according to the invention with a scum baffle included.
Figure 8:
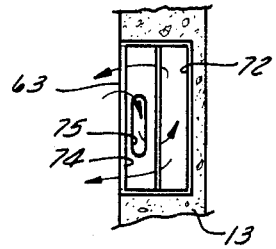
FIG. 8 is a plan view along lines 8—8 in FIG. 7.

FIGS. 7 and 8 show yet a third embodiment of the invention wherein the overflow channels are provided by inner steel liners 72, each provided with a baffle 74 which functions as a scum stop. Additionally, the liner 72 in FIG. 7 is provided with a floor level opening 75 which obviates the need for the standard orifice liners 31.

As mentioned, according to the present invention the second stage orifices 61 may be set in any of various points. For example, the orifices 61 may be set in between the original orifices 27 as needed.

The profile of a portion of channel 22 is shown in FIG. 3. The horizontal upper and lower broken lines respectively indicate the levels of the flow in the channels at maximum and average flow rates. As described, the second stage orifice 61 is selectively positioned between such upper and lower levels. The positioning of the second stage orifices 61 can be such that a wide range of flows above the average (design) condition can be accommodated depending upon the headloss constraints.

The additional orifices 61 will be placed throughout the channel 22 as required for proper flow distribution. The broken lines from the ports 27 shown in FIG. 3 indicated only diagrammatically the distribution of the flow from the ports to the lower edge of the skirt 34 of tank 11 where the flow then enters the tank.

Numerous modifications and variations of the disclosed embodiments will occur to those skilled in the art. For example, steel construction of the influent and effluent flow channels can be used, and two directional flow as shown in U.S. Pat. No. 3,717,257 may be substituted for the described unidirectional flow. The cross sectional flow area of the channels 22 and 35 may be varied by the pitch of the channel floor or by the width of the channels as defined by the spacing of the walls. It is expressly to be understood, therefore, that these modifications, and equivalents thereof, may be employed while remaining within the spirit and scope of the invention as defined in the following claims.

I claim:

1. In a sedimentation tank having a peripheral feed channel through which liquid can flow at varying elevations and with corresponding variations in hydraulic force; said channel provided with a floor and means defining a series of first stage orifices consisting of lower ports through which liquid can gradually flow from said feed channel into the tank without disturbing the sedimentation process, and an effluent weir which maintains the level of liquid in the tank within specified limits; wherein the improvement comprises:

means for maintaining the hydraulic force of said incoming liquid within predetermined limits, comprising;

means defining a plurality of second stage orifices extending through a side wall of said channel at an elevation at or above the floor of said channel between a normal liquid elevation and a predetermined maximum liquid elevation limit;

means defining a plurality of hollow overflow conduits in said side wall of said channel which correspond to and adjoin said second stage orifices to permit the passage of water from the channel into said tank without otherwise physically obstructing the flow of liquid in said channel or creating a turbulence in said tank; and said overflow conduits including a scum baffle and weir for allowing liquid to flow under the baffle and over the weir while preventing floating material from passing into said tank.

2. The sedimentation tank defined in claim 1, wherein said second stage orifices are placed at regular intervals around said feed channel.

3. The sedimentation tank defined in claim 1, wherein said feed channel is defined by said floor and by radially inner and outer peripheral walls, and said overflow conduits are set in said inner wall.

4. The sedimentation tank defined in claim 1, wherein said second stage orifices are located at floor level.

5. The sedimentation tank defined in claim 1, wherein said overflow conduits include at the lower ends thereof dispersion baffles for dispersing the flow through said overflow conduits into said tank.

6. The sedimentation tank as defined in claim 1, further comprising means for adjusting the elevation of said second stage orifices, said adjusting means including a weir plate fastened to the entrance of said overflow conduits.

* * * * *